United States Patent
Lee

(10) Patent No.: US 7,095,447 B2
(45) Date of Patent: Aug. 22, 2006

(54) OSD (ON SCREEN DISPLAY) CURSOR DISPLAY METHOD AND CURSOR IMAGE DISPLAY APPARATUS

(75) Inventor: Sung Lyong Lee, Seoul (KR)

(73) Assignee: Samsung Electronics Co., Ltd., Kyonggi-do (KR)

( * ) Notice: Subject to any disclaimer, the term of this patent is extended or adjusted under 35 U.S.C. 154(b) by 758 days.

(21) Appl. No.: 09/840,020

(22) Filed: Apr. 24, 2001

(65) Prior Publication Data

US 2002/0021369 A1 Feb. 21, 2002

(30) Foreign Application Priority Data

Apr. 24, 2000 (KR) .............................. 2000-21558

(51) Int. Cl.
*H04N 5/50* (2006.01)
*H04N 9/76* (2006.01)

(52) U.S. Cl. ..................... 348/569; 348/601; 348/734; 345/157

(58) Field of Classification Search ................ 348/569, 348/461, 468, 465, 475, 563, 553, 601, 734, 348/714; 345/716, 754, 764, 765, 810, 817, 345/856, 157, 160; H04N 5/50, 9/76
See application file for complete search history.

(56) References Cited

U.S. PATENT DOCUMENTS

| 5,751,373 | A | * | 5/1998 | Ohyama et al. | 725/59 |
| 5,986,638 | A | * | 11/1999 | Cheng | 345/857 |
| 6,064,402 | A | * | 5/2000 | Shindou et al. | 345/467 |
| 6,292,203 | B1 | * | 9/2001 | Wang | 345/682 |
| 6,453,110 | B1 | * | 9/2002 | Kawamura et al. | 386/46 |
| 6,462,746 | B1 | * | 10/2002 | Min et al. | 345/545 |

* cited by examiner

*Primary Examiner*—Trang Tran
(74) *Attorney, Agent, or Firm*—Sughrue Mion, PLLC

(57) ABSTRACT

An OSD cursor display method and an OSD image display apparatus are provided, wherein an information that has an own cursor display data is transmitted from a display apparatus to an OSD source, and when said OSD source wants to transmit an OSD cursor to said display apparatus, it is checked whether said display apparatus has an own cursor display data, said OSD source transmits only cursor display location information if said display apparatus has the own cursor display data, and the own cursor display data is displayed at a received cursor display location. Therefore, since the OSD source only transmits cursor display location information to the display apparatus, the processing speed becomes faster, and therefore the location moving time in moving a cursor on a screen becomes faster and the movement of the cursor becomes smooth.

10 Claims, 3 Drawing Sheets

OSD (ON SCREEN DISPLAY) CURSOR DISPLAY METHOD AND CURSOR IMAGE DISPLAY APPARATUS

BACKGROUND OF THE INVENTION

1. Field of the Invention

The present invention relates to an On Screen Display (OSD) cursor display method and an OSD image display apparatus, particularly to a method and an apparatus that can display an OSD cursor transmitted from an OSD source to a display apparatus more smoothly. The present application is based on KPA 2000-21558, which is incorporated herein by reference.

2. Description of the Related Art

A digital television (DTV) is provided, which displays on a screen not only a digital television image signal received through its own tuner but also image information from various sources. That is, a DTV, for example, is provided with a satellite television signal provided from a satellite through a satellite broadcast receiver such as a set top box STB or a cable converter, an image signal reproduced from a digital video disc (DVD) player, and an image signal reproduced from a digital video cassette recorder (DVCR) through an IEEE 1394 bus. The DTV 1394 interface standard is specified in the EIA-775 standard series. Here, a source providing an image signal is defined as a producer, and an apparatus receiving and displaying an image signal like DTV is defined as a consumer. In the DTV 1394 standard, an image signal is provided to a consumer in an MPEG transport stream, and OSD data is provided to a consumer in a bitmap format. Also, a producer and a consumer exchange a control signal and a state signal.

In general, a producer and a consumer each adopt a separate remote controller for a user interface. Therefore, the user interface of a consumer is made to interactively control the consumer while displaying in an OSD screen through a remote controller. But, although a producer is made to interactively control the producer while displaying in an OSD screen through a remote controller, the OSD screen is actually displayed through a DTV. Therefore, if the amount of OSD data transmitted between the producer and the consumer is large, by receiving OSD data of the producer in the consumer, an adaptive display of a displayed screen becomes difficult, according to the excessive amount of processed data for displaying. That is, the change and movement of an image can be unnatural enough for a viewer to visually observe. This phenomenon acts to reduce the value of a product.

Particularly, a smooth operation of an OSD screen becomes more important in evaluating the value of a product, as the user interface of the product becomes more convenient and the function becomes more diverse.

SUMMARY OF THE INVENTION

The present invention has been completed in view of the above-described problems involved in the prior art, and it is an object of the present invention to provide an OSD cursor display method and an OSD image display apparatus which can display an OSD cursor provided from an OSD source faster and more smoothly, because it has to transmit only OSD cursor display location information from the OSD source to the display apparatus.

According to one aspect of the present invention, the method of the present invention, wherein an information that has an own cursor display data is transmitted from a display apparatus to an OSD source, and when said OSD source wants to transmit an OSD cursor to said display apparatus, it is checked whether said display apparatus has an own cursor display data, and said OSD source transmits only cursor display location information in case that said display apparatus has the own cursor display data, and the own cursor display data is displayed at a cursor display location received in the display apparatus.

According to another aspect of the present invention, the apparatus of the present invention comprises a display apparatus which includes a memory where an own cursor display data is stored and outputs existence information of the own cursor display data and displays the cursor display data on a screen by reading the cursor display data stored in said memory in response to the received cursor display location information, an OSD source remote controller for generating a cursor display command on the screen of said display apparatus, and an OSD source which receives and stores the existence information of said cursor display data and transmits the cursor display location information on the screen of said display apparatus to said display apparatus if the cursor display command is received from said OSD source remote controller.

According to the present invention, because only cursor location information of a cursor is to be transmitted in transmitting OSD cursor display data between a producer and a consumer, the amount of data transmission is reduced. Therefore, because the amount of data to be processed in the consumer is reduced, it is possible to display an OSD cursor of the producer on a screen of the consumer at high speed.

BRIEF DESCRIPTION OF THE DRAWINGS

Further objects and advantages of the invention can be more fully understood from the following detailed description taken in conjunction with the accompanying drawings in which.

DETAILED DESCRIPTION OF PREFERRED EMBODIMENTS

The present invention will hereinafter be described in detail through one embodiment of the present invention, with reference to the accompanying drawings.

Figure 1:
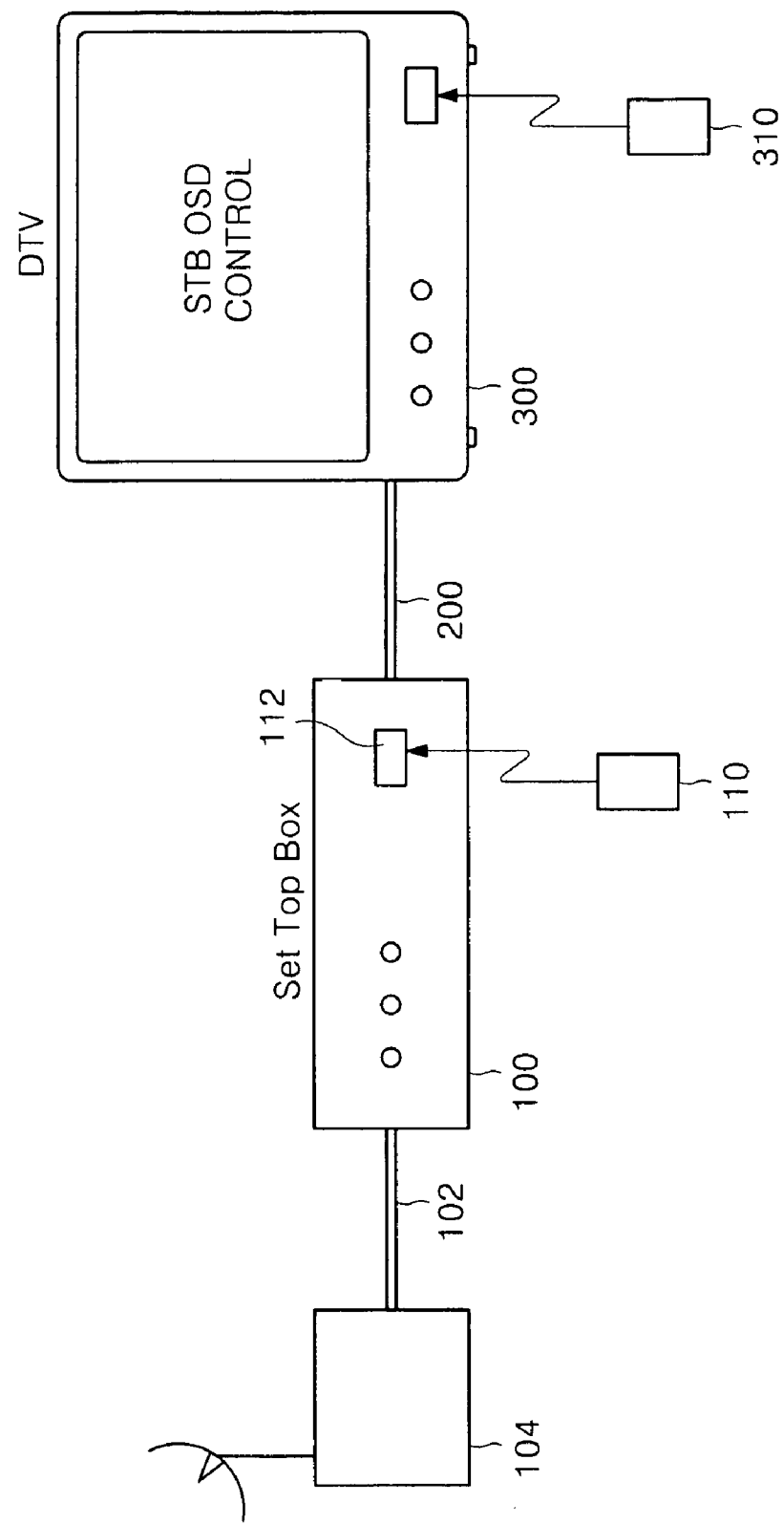
FIG. 1 is a drawing showing one embodiment of an OSD image display apparatus according to the present invention.

FIG. 1 shows one embodiment of an OSD image display apparatus according to the present invention.

A set top box (STB) 100 and a producer receive a digital satellite broadcast signal provided from a satellite through a satellite antenna 104 connected through a coaxial cable 102. The set top box 100 detects an MPEG transport stream from the received satellite broadcast signal and then provides the detected MPEG transport stream to a DTV 300 through a DTV 1394 bus 200.

The set top box 100 inputs a command generated through a remote controller 110 through a remote controller receiving part 112. Corresponding OSD data is generated in response to the input command and is provided to the DTV 300 through the DTV 1394 bus 200.

The DTV 300 recovers an image signal by decoding the received MPEG transport stream through an MPEG decoder, and displays on a screen by overlapping the recovered image signal and the received OSD data. Therefore, a user can control an STB 100 while viewing an OSD screen of the STB displayed on a screen of the DTV, by using the remote controller 110 for the STB.

The DTV 300 is controlled through a DTV remote controller 310.

Figure 2:
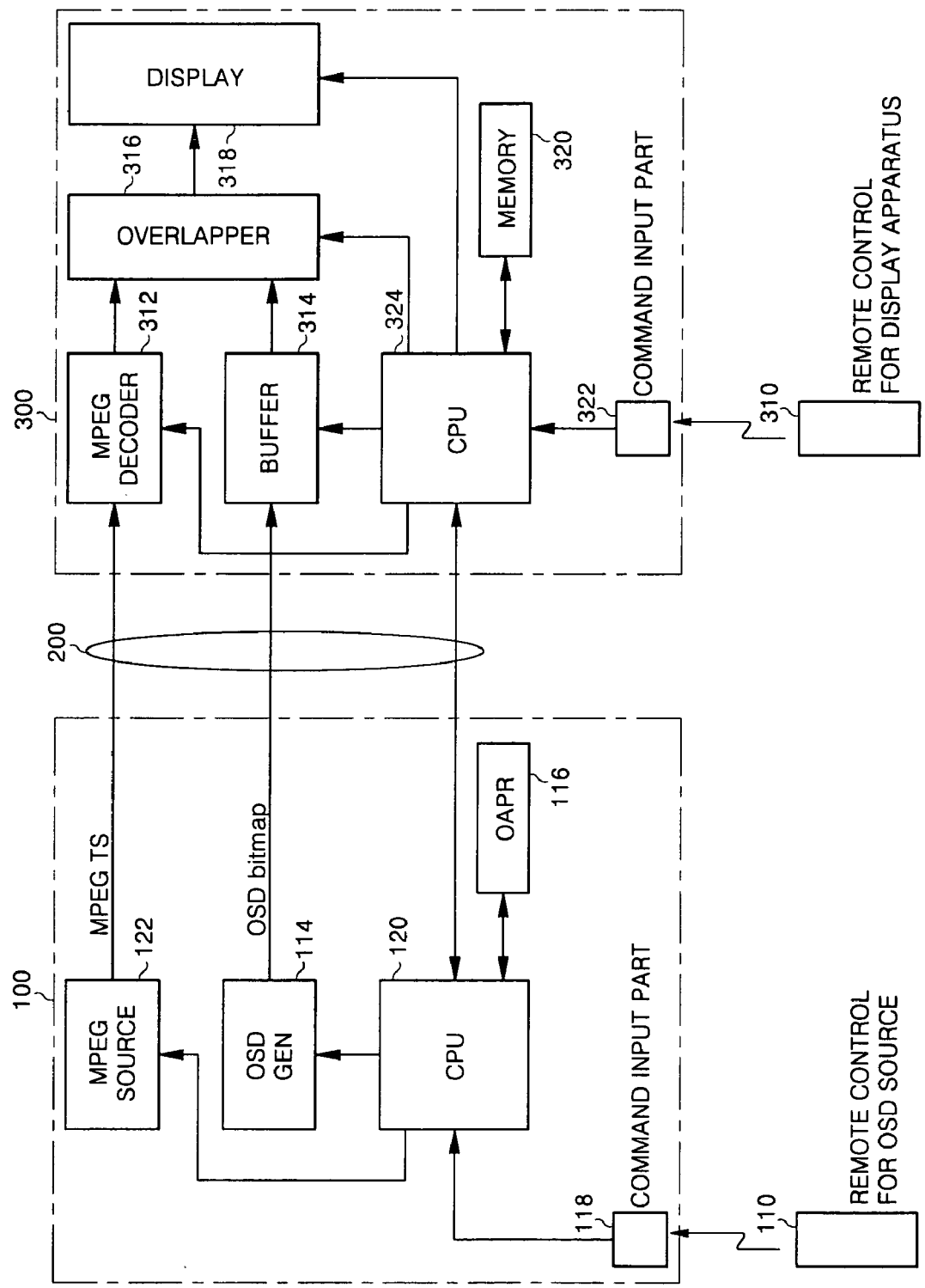
FIG. 2 is a circuit diagram to illustrate the operation of FIG. 1.

FIG. 2 shows a circuit block diagram to illustrate the operation of FIG. 1.

The set top box 100 and the DTV 300 are interconnected with a DTV 1394 bus 200.

Figure 3:
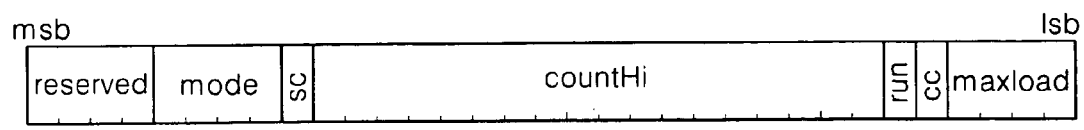
FIG. 3 is a drawing showing data structure of an output asynchronous plug register (OAPR) of a producer according to the present invention.

The set top box 100 includes an MPEG source 122, an OSD generator 114, an output asynchronous plug register (OAPR) 116, a command input part 118 and a control part 120. The MPEG source detects an MPEG transport stream by inputting a satellite broadcast signal in response to the control of the control part 120 and provides the detected MPEG transport stream to the DTV 300. The OSD generator 114 generates OSD display data in bitmap format in response to the control of the control part 120. The command input part 118 receives a command signal generated by the remote controller 110 and provides the command signal to the control part 120. The output asynchronous plug register (OAPR) 116 stores four bytes of data as shown in FIG. 3. The data structure of an output asynchronous plug register (OAPR) 116 in FIG. 3 is shown in Table 1.

TABLE 1

| CLASSIFICATION | DESCRIPTION |
| --- | --- |
| RESERVED | 0 |
| MODE | 0: FREE, 1: RESERVED, 2: SUSPEND, 3: RESERVED, 4: RESUME, 5: SEND, 6~7: RESERVED |
| SC | TOGGLE BIT |
| COUNTHi | 18 BITS COUNT VALUE |
| RUN | |
| CC | WHETHER SUPPORTING CONSUMER OR NOT<br>0: DO NOT HAVE OWN CURSOR<br>1: HAVE OWN CURSOR |
| Maxload | INDICATE DATA-PAYLOAD SIZE FOR ENTERING 4 BITS SEGMENT BUFFER |

According to the present invention, an output asynchronous plug register (OAPR) information is provided from the DTV to the STB when the STB 100 and the DTV 300 are initially connected. At this time, if a DTV has own cursor display data, a bit value of CC is set as "1".

The DTV 300 includes an MPEG decoder 312, a buffer 314, an overlapper 316, an image display 318, a memory 320, a command input part 322 and a control part 324. The MPEG decoder 312 outputs image data to the overlapper 316 by extending a compression-coded image data by inputting an MPEG transport stream. The buffer 314 buffers the provided OSD data and provides the corresponding OSD data to the overlapper 316 in response to the control of the control part 324. The overlapper 316 overlaps the image data and the OSD data and provides it to the image display 318. OSD cursor display data is stored in the memory 320 as an own OSD generator of the DTV. The command input part 322 receives a command signal generated from the remote controller 310 and provides the command signal to the control part 324.

As noted above, the OSD image display apparatus constituted with the OSD source of the STB 100 and the display apparatus of the DTV 300 sets the CC information of an output asynchronous plug register (OAPR) information to "1" from the STB 100, while connecting the STB 100 and the DTV 300.

The STB 100 checks whether the connected DTV 300 has its own cursor display data by referring to the output asynchronous plug register (OAPR) 116 through the control part 120, in the case that the OSD cursor display command is inputted through the remote controller 100. Here, if the CC value is set as "1", the STB 100 outputs OSD cursor display information by providing a control signal to the OSD generator 114. Then, the OSD cursor display information includes only eight bits of cursor display location information, or cursor ID information.

Figure 4:
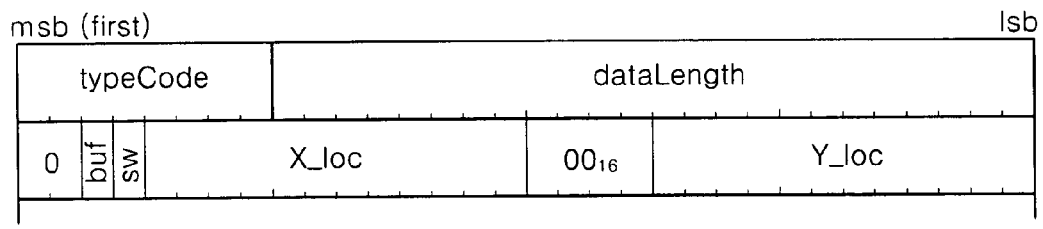
FIG. 4 is a drawing showing a sub frame structure of OSD cursor data transmitted from a producer to a consumer according to the present invention.

FIG. 4 shows the sub frame structure of OSD cursor data, which includes TYPECODE of one byte, data length of three bytes, BUF of one bit, SW of one bit, 12 bits X coordinate value of a cursor display location, and 12 bits Y coordinate value of a cursor display location. TYPECODE comprises "0XF3" indicating a consumer own cursor possessing mode and the data length of four bytes. Here, "0X" of "0XF3" indicates HEXA CODE. Therefore, "F3" indicates a value of HEXA CODE. BUF has a value of "0", and SW has a value of "0". "00" of BUF and SW is a control code for locating cursor display data in the buffer 314 promptly in the consumer.

Therefore, the DTV 300 analyzes the sub frame in FIG. 4 received in the buffer 314, and since if the TYPECODE value is "0XF3" it is an own cursor display mode. After reading the own cursor display data stored in the memory 320 and storing promptly said own cursor display data in the buffer 314, the DTV displays the own cursor display data stored in the buffer 314 at a screen location designated with given X and Y coordinate values.

Therefore, according to the present invention, the STB 100 does not send the whole OSD cursor display data in bitmap format at every cursor location movement to the DTV 300. If only the OSD cursor display data is sent, the STB 300 reads the own cursor display data and displays the own cursor display data at a given location on the screen. Therefore, because the amount of data reception and transmission between the STB 100 and the DTV 300 is largely reduced, the movement of the cursor on the screen can be displayed very fast, and, thus, it can be viewed very naturally by a user.

As described above, because only cursor location information of a cursor is to be transmitted in transmitting OSD cursor display data between a producer and a consumer, the amount of data transmission is reduced. Therefore, because the amount of data to be processed in the consumer is reduced, it is possible to display an OSD cursor of the producer on a screen of the consumer at high speed.

While the present invention has been described with respect to the particular embodiments, it will be apparent to those skilled in the art that various changes and modifications may be made without departing from the spirit and scope of the invention as defined in the following claims.

What is claimed is:

1. An OSD cursor display method, comprising the steps of:
- transmitting an information that has an own cursor display data from a display apparatus to an OSD source;
- checking whether said display apparatus has the own cursor display data, when an OSD cursor is to be transmitted from said OSD source to said display apparatus;
- transmitting only cursor display location information in said OSD source, if said display apparatus has the own cursor display data; and
- displaying the own cursor display data at a cursor display location received in the display apparatus.

2. An OSD image display apparatus, comprising:
- a display apparatus which includes a memory where an own cursor display data is stored, a unit that outputs existence information of the own cursor display data, and a display that displays the own cursor display data on a screen by reading the own cursor display data stored in said memory in response to received cursor display location information;
- an OSD source remote controller for generating a cursor display command on the screen of said display apparatus; and
- an OSD source for receiving and storing the existence information of said own cursor display data, and transmitting the cursor display location information on the screen of said display apparatus to said display apparatus if the cursor display command is received from said OSD source remote controller.

3. The OSD image display apparatus of claim 2, wherein the OSD source comprises:
- an MPEG source for supplying a detected MPEG transport stream to the display apparatus;
- an OSD generator for generating OSD display data in bitmap format;
- a register for storing data; and
- a controller for controlling the MPEG source, the OSD generator, and the register.

4. The OSD image display apparatus according to claim 3, wherein the register is an output asynchronous plug register.

5. The OSD image display apparatus according to claim 3, wherein the OSD source and the display apparatus are connected through an IEEE 1394 bus.

6. The OSD image display apparatus according to claim 3, wherein the OSD source further comprises:
- a command input part for receiving a command signal from the OSD source remote controller and providing the command signal to the controller.

7. The OSD image display apparatus of claim 2, wherein the display apparatus comprises:
- an MPEG decoder for decoding an MPEG transport stream and outputting image data;
- a buffer for buffering OSD data;
- an overlapper for overlapping the image data and the OSD data and providing overlapped data to the screen; and
- a controller for controlling the MPEG decoder, the buffer, the overlapper, the memory, and the screen.

8. The OSD image display apparatus according to claim 7, wherein the OSD image display apparatus further comprises:
- a display apparatus remote controller.

9. The OSD image display apparatus according to claim 8, wherein the display apparatus further comprises:
- a command input part for receiving a command signal from the display apparatus remote controller and providing the command signal to the controller.

10. An OSD cursor display method, comprising the steps of:
- checking whether a display apparatus has an own cursor display data;
- transmitting an information from a display apparatus to an OSD source if said display apparatus has the own cursor display data;
- transmitting only cursor display location information in said OSD source to the display apparatus; and
- displaying the own cursor display data at a cursor display location received from the OSD source in the display apparatus.

* * * * *